United States Patent [19]

Visentini et al.

[11] Patent Number: 5,121,808
[45] Date of Patent: Jun. 16, 1992

[54] ADJUSTABLE GAUGE STEERING AXLE

[75] Inventors: Ivano Visentini, S. Maria Di Sala; Gianni Massaccesi, Cadoneghe, both of Italy

[73] Assignee: Carraro S.p.A., Italy

[21] Appl. No.: 627,139

[22] Filed: Dec. 13, 1990

[30] Foreign Application Priority Data

Dec. 15, 1989 [IT] Italy .................. 41767 A/89

[51] Int. Cl.⁵ .................. B62D 5/06; B60B 35/10
[52] U.S. Cl. .................. 180/155; 180/906; 280/638; 74/586; 301/128
[58] Field of Search .................. 301/128; 180/79, 152, 180/155, 159, 162, 163, 906; 280/93, 638; 74/586, 594

[56] References Cited

U.S. PATENT DOCUMENTS

| | | | |
|---|---|---|---|
| 1,129,153 | 2/1915 | Winter | 74/586 X |
| 1,559,368 | 10/1925 | Poole | 301/128 |
| 2,584,709 | 2/1952 | Johnson | 74/586 |
| 3,000,673 | 9/1961 | Lansing | 301/128 |
| 3,496,800 | 2/1970 | Brezinski | 74/586 |
| 3,782,491 | 1/1974 | Herbenar | 180/906 X |
| 4,350,222 | 9/1982 | Lutteke et al. | 280/638 X |
| 4,359,123 | 11/1982 | Haupt et al. | 180/906 X |
| 4,449,600 | 5/1984 | Telfer | 280/638 X |
| 4,589,499 | 5/1986 | Behrens | 280/638 X |
| 4,986,386 | 1/1991 | Iwamoto et al. | 180/906 X |

FOREIGN PATENT DOCUMENTS

| | | | |
|---|---|---|---|
| 99404 | 4/1990 | Japan | 301/128 |
| 814277 | 6/1959 | United Kingdom . | |

Primary Examiner—Charles A. Marmor
Assistant Examiner—Kevin Hurley
Attorney, Agent, or Firm—Sughrue, Mion, Zinn Macpeak & Seas

[57] ABSTRACT

An adjustable gauge steering axle is disclosed which comprises an adjustable length beam and a steering control including a double-acting, dual piston rod hydraulic cylinder. Each piston rod of the hydraulic cylinder is connected to a corresponding steering arm through a respective strut which is adjustable telescopingly in length; a swivel joint intervenes between the rod and the strut.

3 Claims, 3 Drawing Sheets

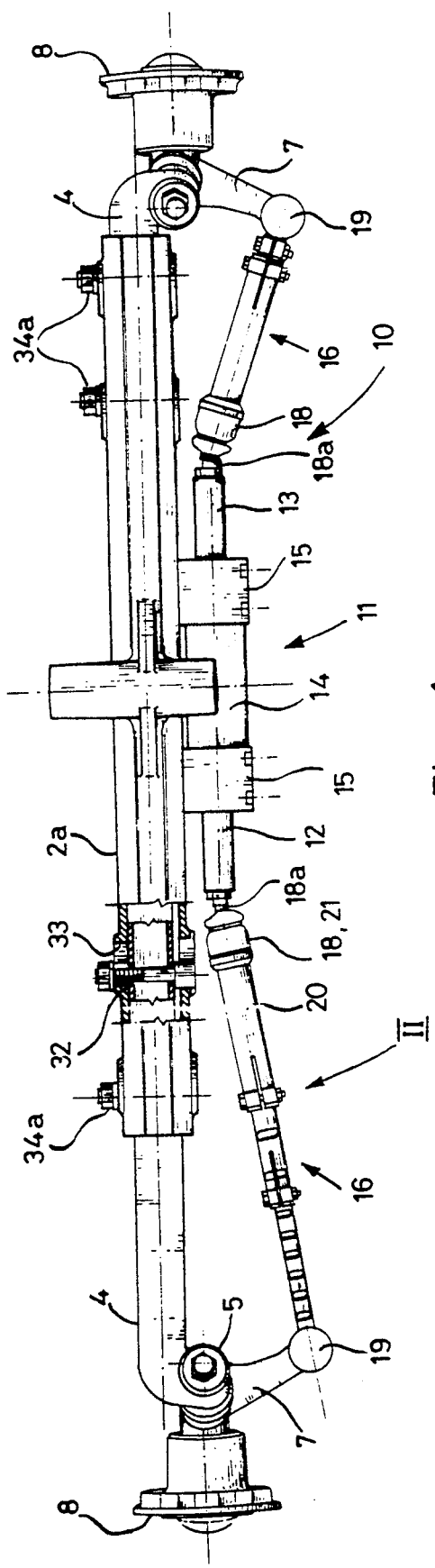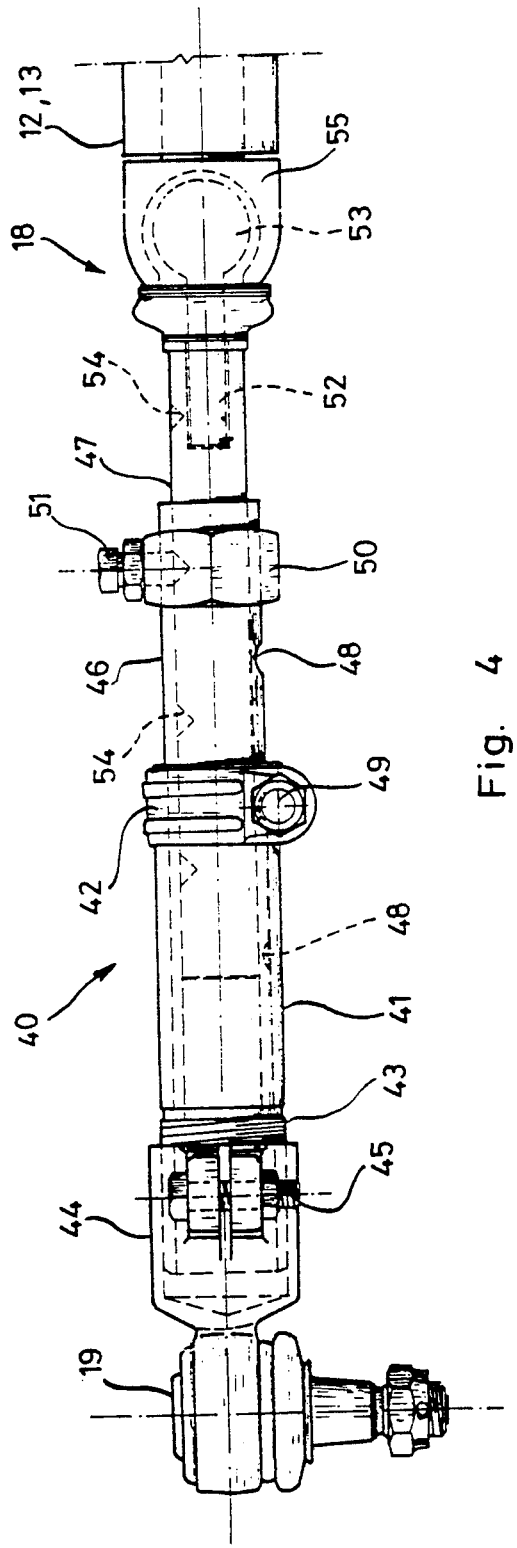

ADJUSTABLE GAUGE STEERING AXLE

BACKGROUND OF THE INVENTION

This invention relates to an adjustable gauge steering axle particularly intended for two-wheel drive agricultural tractors, being of a type which comprises an adjustable length beam and a steering control associated with said beam and including a double-acting, dual piston rod hydraulic cylinder with either piston rods active on a corresponding steering arm through a respective strut.

An axle having these features is known from Massey Ferguson France, a French corporation.

This prior axle has a steering control which includes a double-acting, dual piston rod hydraulic cylinder, the two piston rods whereof, which juts out of the hydraulic cylinder body from opposed axial ends thereof, are each provided with a telescoping extension whereby they are connected to a respective one of the steering arms. Each steering arm is made, in turn, fast rotatively with a spindle carrying the wheel hub. The piston rods of the hydraulic cylinder, in combination with their extensions, will behave, therefore, as a single, rigid straight bar which is adjustable telescopically to accommodate gauge changes and interconnects the steering arms.

In consequence of the geometry of the steering arms and the spindles (which would normally lie at an angle from vertical) the hydraulic cylinder is swivel connected to the axle beam by means of a pivot having its axis parallel to the beam and of a swivel joint intervening between said pivot or kingpin and the cylinder body.

Accordingly, the hydraulic cylinder will move, on operation of the steering system, toward and away from the axle beam and oscillate both about the kingpin and the swivel joint.

This axle configuration has a major drawback in that it is high in volume requirements due to the positioning and shifting capability of the hydraulic cylinder. Such volume requirements are sometimes in conflict with the positioning of other components of an agricultural tractor, which makes the axle unsuited to fill specific demands for compactness.

Another example of an adjustable gauge axle is described in French Patent No. 2,173,517. The axle of this prior patent has a steering control which includes a double-acting, dual piston rod hydraulic cylinder wherein the piston rods act on their corresponding steering arms through respective rigid struts and are extensible telescopically to the desired gauge dimension. Understandably, the strut length would be settled by the sizing of the steering control and the axle in the narrowest gauge condition; consequently, the struts will be somewhat short compared to the length of the piston rods, with the latter extended telescopically to provide intermediate or widest gauge dimensions. The reduced length dimension of the struts relatively to the piston rods, especially with an axle designed for tight steering angles, is a source of increased stress on the piston rods tending to bend them. This flexural stress results eventually in unacceptable wear of the seals active on each piston rod of the steering control. This problem is made more serious by that, on account of the telescoping design of interest, the piston rods are constructed tubular, at least in part, and hence weaker than conventional rods.

With other fixed gauge axles (front axles for four-wheel drive tractors), known from this Applicant's production, the volume problem has been addressed by affixing the double-acting, dual piston rod hydraulic cylinder of the steering control to the axle beam and interposing a swivel joint between each piston rod and its respective strut connecting it to the steering arm.

In this way, the cylinder could be brought nearer the axle beam, locating it at an offset location from the line of action of the steering arms; however, the axle allows for no gauge adjustment.

SUMMARY OF THE INVENTION

The problem that underlies this invention is to provide an adjustable gauge steering axle whose construction and operation be apt to overcome the drawbacks affecting the prior art as mentioned above.

This problem is solved by an axle as indicated being characterized in that said struts are adjustable in length telescopically and linked to their respective piston rod through an intervening swivel joint.

By having the struts, rather than the piston rods as suggested by French Patent No. 2,173,517, of telescoping construction, any flexural strain on the portion of the steering control made weaker for the desired telescopic adjustment can be removed and the portion loaded only axially by virtue of the swivel joints provided at both ends thereof.

An axle including a telescoping strut steering control is described in UK Patent No. 814277. However, that axle incorporates a steering control including a central crank arrangement instead of the hydraulic cylinder provided by this invention. Such a crank arrangement results in unacceptable space requirements, especially where tight steering angles are involved, and does not allow the steering control to be located close to the axle beam.

BRIEF DESCRIPTION OF THE DRAWINGS

The invention features and advantages will be better appreciated from the following detailed description of a preferred embodiment thereof, given by way of illustration and not of limitation with reference to the accompanying drawings, where:

FIG. 1 is a top plan view of an axle embodying this invention;

FIG. 4 is a detail view, drawn to an enlarged scale, of the axle shown in the previous drawing figures.

DETAILED DESCRIPTION OF THE INVENTION

Figure 2:
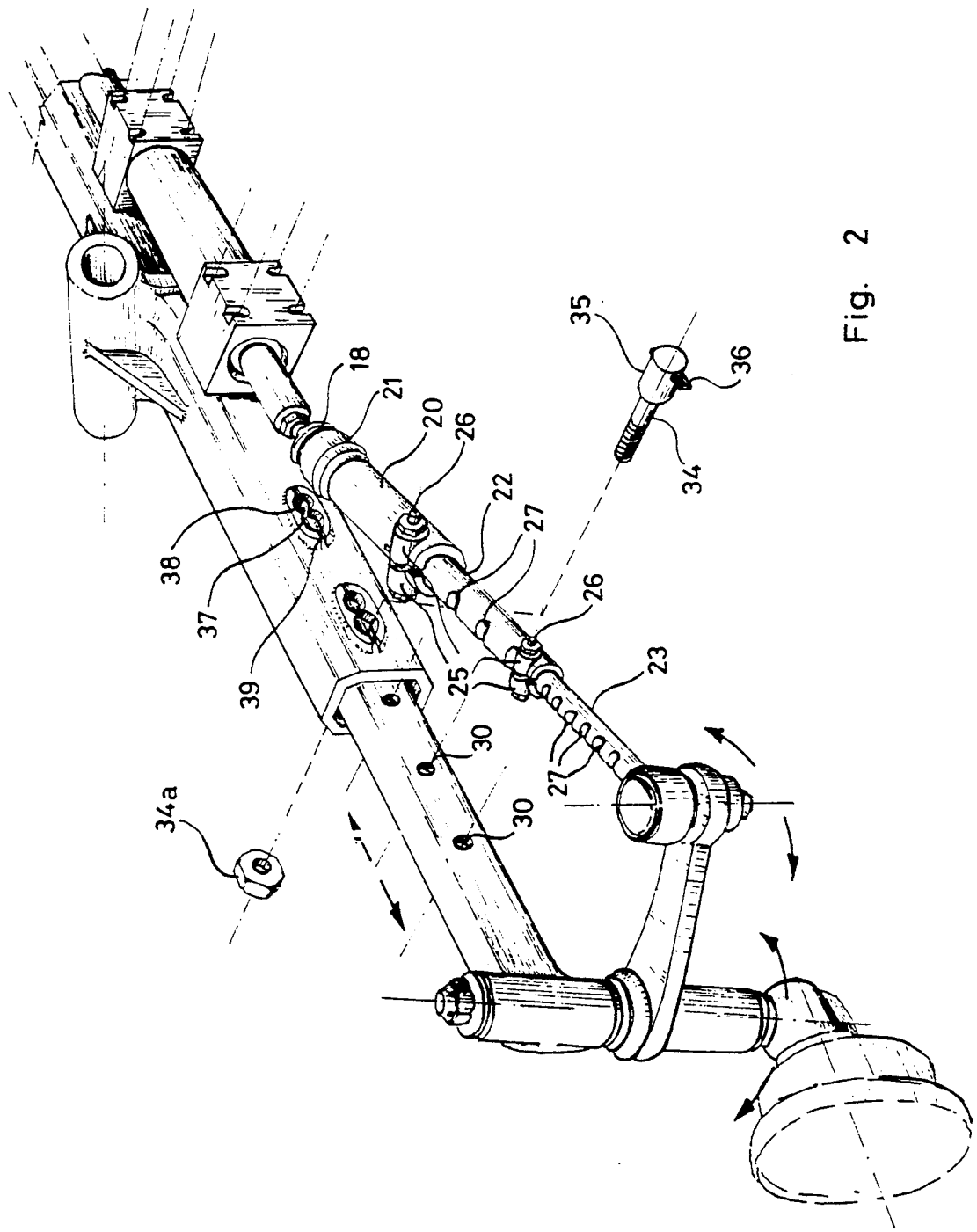
FIG. 2 is a perspective detail view of the axle shown in FIG. 1.
Figure 3:
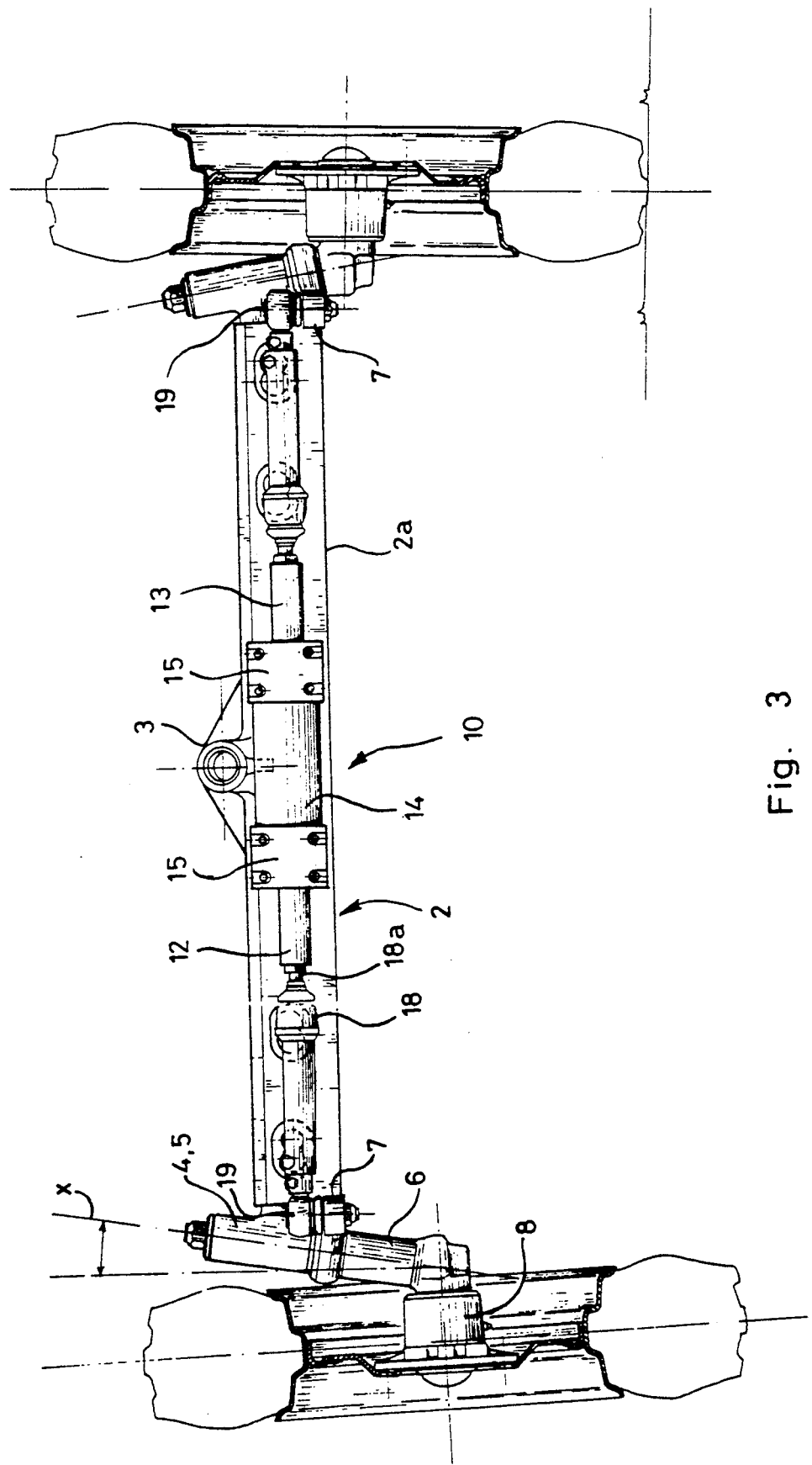
FIG. 3 is a front elevation view of the axle shown in the previous drawing figures.

Throughout the drawing views, generally shown at 1 is an adjustable gauge steering axle, such as a front steering axle for two-wheel drive agricultural tractors, embodying this invention.

The axle 1 comprises a beam 2 which includes a tubular crosspiece 2a carrying, at the center thereof, a hinge element 3 whereby the beam 2 can be attached swingingly to a tractor support.

An arm 4 fits drawably through each axial end of the crosspiece 2a. Each arm 4 carries a support 5 for a spindle 6 having an axis X at an angle from vertical and providing rotary support for a wheel hub 8.

Attached to each spindle 6 is a steering arm 7 for pivoting the spindle about the axis X during operation of the steering system.

Steering is provided by a steering control, generally shown at 10.

The steering control 10 comprises a hydraulic cylinder 11 of the double-acting, dual piston rod 12, 13 variety, wherein the piston rods are axially movable in sealed fashion by a piston slidable within a cylindrical housing 14. The housing 14 comprises a tubular body, closed at opposed axial ends by respective end caps 15 through which the piston rods 12, 13 are passed. The end caps 15 are also effective to affix the housing 14 rigidly to the tubular crosspiece 2a, thereby the cylinder 11 is both supported rigidly on said crosspiece, being set close against it to occupy the least overall volume, and protected by the beam 2 against possible shocks.

Each piston rod 12, 13 is interconnected with its respective steering arm 7 through a corresponding strut 16. Between each strut 16 and the corresponding rod 12, 13 of the cylinder 11 is a ball-type swivel joint 18 of a conventional design.

A similar ball joint 19 is provided to connect the strut 16 to corresponding steering arm 7.

The swivel joints 18 are connected to the free end of their corresponding piston rods by a threaded fitting 18a operative to adjust the wheel hub 8 toe-in.

The struts 16 are adjustable telescopically in length, and comprise a tubular sleeve 20 welded to a base 21 of the joint 18 and wherein first and second draw-outs 22, 23 fit telescopically. The end of the tubular sleeve 20 and of the first draw-out 22 facing the joint 19 can be clamped through the provision of two perforated ears 25 adapted to receive the shank of a screw 26.

In a similar manner, a plurality of notches, all indicated at 27, are formed on the first and second draw-outs 22, 23 which are distributed at pitch intervals and shaped to permit the screw 26 to be passed through the corresponding ears 25 only when one notch 27 becomes aligned to such ears.

In this way, with the screw 26 passed through the corresponding ears 25 and tightened, the draw-outs 22, 23 are locked relatively to each other and the tubular sleeve 20.

The pitch distance of the notches 27 on the second draw-out 23 is a sub-multiple (one half, the example shown) of the pitch distance of the notches on the first draw-out 22.

This allows the struts 16 to be adjusted in length by half pitch distances.

The length adjustment of the struts 16 serves to adapt the steering control 10 to accommodate gauge changes of the beam 2.

In order to accommodate such gauge changes, each arm 4 is provided with a plurality of through-going holes 30 set at pitch distances apart, and two pairs of through-going holes 32, 33 are formed in the tubular crosspiece 2a.

The holes 32, 33 in each pair are a distance between centers which is equal to a submultiple (one half, in the example shown) of the pitch distance of the holes 30 in the arms 4 to enable adjustment of the axle 1 gauge by half-pitch increments.

Through said holes 30, 32 and 33, a screw 34 is passed for locking the corresponding arm 4 to the crosspiece 2a.

The screws 34 have a threaded shank and a cheese head 35, enlarged relatively to the shank, whereacross a key 36 is implanted.

The head 35 can be received substantially fully within a coaxial socket 37, 38 with the corresponding hole 32, 33 and being formed in the opposite side of the crosspiece 2a.

The sockets 37, 38 intersect each other partway on account of the small distance between the centers of the holes 32, 33.

The key 36 is received in a cutout 39 in each socket 37, 38 to prevent the screw 34 from turning as a nut 34a, threaded onto its shank, is being tightened.

In order to adjust the axle 1 gauge, the screws 34 are first taken out of the holes 30, 32 and 33. Concurrently therewith, the ear 25 holding screws are taken out.

Under this condition, both the struts 16 and the axle beam 2 can be extended unrestrictedly. The desired extension is achieved by bringing the holes 30 into registry with either of the holes, 32 or 33, in the tubular crosspiece. The draw-outs 22 and 23 are then adjusted to suit.

Shown in FIG. 4 is a modified embodiment of the struts 16, generally designated by the reference numeral 40; like parts carry the same reference numerals as in the previous figures.

The struts 40 are also interposed in use between the free end of the corresponding rod 12, 13 and the respective steering arm 7, being connected to said components by respective ball joints 18, 19.

Said struts 40 comprise a tubular sleeve 41 having a free end carrying a strap 42 and an opposed end 43 threaded, which is received in threaded engagement in a threaded tang 44 of the joint 19. By varying the extent of the thread engagement of the end 43 into the tang 44, the amount of wheel hub 8 toe-in can be adjusted. On the desired adjustment being accomplished, the tang 44 is clamped down onto the sleeve 41, so as to lock it, by means of a screw 45.

First and second draw-outs, respectively shown at 46 and 47, telescope into the sleeve 41 and can be pulled adjustably out thereof to have the strut 40 accommodate adjustments in the axle 1 gauge.

The first draw-out 46 comprises a tubular element carrying, on its outskirt, a plurality of notches 48 distributed at pitch intervals and adapted to engage the shank of a screw 49 provided on the strap 42 to ensure locked engagement of the first draw-out 46 with the sleeve 41 on completion of the adjusting operation. The free end of the tubular element mounts a collar 50 carrying a set screw 51. The second draw-out 47 comprises a section of a round bar formed, at an axial end thereof, with a threaded seat for a threaded shank 52 fast with the ball 53 of the joint 18. The outskirt of said bar section is also formed with notches 54 at pitch intervals which are adapted to co-operate with the setscrew 51 to lock the first and second draw-outs 46, 47 to each other. The base 55 of the joint 18 is, in turn, fastened by threading in the free end of the corresponding rod 12, 13.

The axle of this invention affords the primary advantage that it is at one time highly compact and appreciably easy to adjust in a progressive fashion on account of the struts and the beam being both adjustable at half-pitch increments. And yet, the overall construction of the axle is robust and reliable.

An additional advantage of this invention is that an axle so constructed can afford effective protection for the steering control as a whole.

We claim:

1. An adjustable gauge steering axle comprising an adjustable length beam and a steering control associated with said beam and including a double-acting, dual piston rod hydraulic cylinder with either each piston rod connected to a corresponding steering arm through a respective strut, wherein said struts are adjustable in length telescopically and linked to their respective piston rod, through an intervening swivel joint with each strut including a tubular sleeve; a first hollow tubular draw-out telescopically slidable in said sleeve and a second draw-out telescopically slidable in said first draw-out with the adjustment pitch distance on one draw-out being a sub-multiple of the adjustment pitch distance of the other draw-out, each draw-out being provided with notches at predetermined pitch intervals and means cooperating with said notches to lock said strut in adjusted position.

2. An axle according to claim 1, characterized in that said hydraulic cylinder includes a housing affixed to said beam.

3. An adjustable gauge steering axle comprising an adjustable length beam and a steering control associated with said beam and including a double-acting, dual piston rod hydraulic cylinder with either each piston rod connected to a corresponding steering arm through a respective strut,
   wherein said struts are adjustable in length telescopically and linked to their respective piston rod, through an intervening swivel joint with each strut including a tubular sleeve; a first hollow tubular draw-out telescopically slidable in said sleeve and a second draw-out telescopically slidable in said first draw-out, each draw-out being provided with notches at predetermined pitch intervals and means cooperating with said notches to lock said strut in adjusted position, and
   wherein said beam comprises a tubular crosspiece having, at opposed ends thereof, two arms perforated at pitch intervals and fitting telescopically thereinto, said crosspiece being formed with holes adapted to receive a screw for locking the arms to the crosspiece, removably therein, the spacing between the centers of said holes being a sub-multiple of the spacing between the centers of the holes formed in each arm.

* * * * *